(12) United States Patent
Miramond et al.

(10) Patent No.: US 12,475,360 B2
(45) Date of Patent: Nov. 18, 2025

(54) DISTRIBUTED CELLULAR COMPUTING SYSTEM AND METHOD FOR NEURAL-BASED SELF-ORGANIZING MAPS

(71) Applicants: Centre National De La Recherche Scientifique, Paris (FR); Universite Cote D'Azur (UCA), Nice (FR); Ecole Nationale Superieure De L'Electronique Et De Ses Applications (ENSEA), Cergy Pontoise (FR); Cy Cergy Paris Universite, Cergy Pontoise (FR)

(72) Inventors: Benoît Miramond, Antibes (FR); Laurent Rodriguez, Le Cannet (FR); Lyes Khacef, Nice (FR)

(73) Assignees: Centre National De La Recherche Scientifique, Paris (FR); Universite Cote D'Azur (UCA), Nice (FR); Ecole Nationale Superieure De L'Electronique Et De Ses Applications (ENSEA), Cergy Pontoise (FR); Cy Cergy Paris Universite, Cergy Pontoise (FR)

( * ) Notice: Subject to any disclaimer, the term of this patent is extended or adjusted under 35 U.S.C. 154(b) by 1069 days.

(21) Appl. No.: 17/413,342

(22) PCT Filed: Dec. 11, 2019

(86) PCT No.: PCT/EP2019/084724
§ 371 (c)(1),
(2) Date: Jun. 11, 2021

(87) PCT Pub. No.: WO2020/120610
PCT Pub. Date: Jun. 18, 2020

(65) Prior Publication Data
US 2022/0019882 A1     Jan. 20, 2022

(30) Foreign Application Priority Data

Dec. 12, 2018 (EP) .................................... 18306671

(51) Int. Cl.
*G06N 3/063* (2023.01)
*G06N 3/049* (2023.01)
*G06N 3/088* (2023.01)

(52) U.S. Cl.
CPC ............. *G06N 3/063* (2013.01); *G06N 3/049* (2013.01); *G06N 3/088* (2013.01)

(58) Field of Classification Search
CPC ......... G06N 3/063; G06N 3/049; G06N 3/088
See application file for complete search history.

(56) References Cited

U.S. PATENT DOCUMENTS

| 8,103,606 B2 * | 1/2012 | Moussa | G06N 3/063 706/31 |
| 8,250,513 B1 * | 8/2012 | Verma | G06F 30/394 716/135 |

OTHER PUBLICATIONS

Angelo de Abreu de Sousa et al., "An FPGA Distributed Implementation Model for Embedded SOM with On-line Learning," Jul. 3, 2017, 2017 International Joint Conference on Neural Networks (IJCNN), pp. 3930-3937 (Year: 2017).*

(Continued)

*Primary Examiner* — Kamran Afshar
*Assistant Examiner* — Steven Phung
(74) *Attorney, Agent, or Firm* — Banner & Witcoff, Ltd.

(57) ABSTRACT

A neuromorphic computing system configured to be trained using unsupervised learning through distributed computing circuits. The neuromorphic computing system comprises an artificial neural network implemented as a grid of locally connected cells wherein each cell comprises hardware components for neural computing and storage, and is connected to its direct closest neighbors. The neuromorphic computing (Continued)

system comprises a clock system providing periodic active clock edges allowing in each cell to simultaneously and synchronously compute the neuron's Euclidean distance to the input, then compute the Best Matching Unit and the Manhattan distance to it in multiple clock cycles based on a time to Manhattan distance transformation, and finally update the neuron's weights.

12 Claims, 9 Drawing Sheets

(56) References Cited

OTHER PUBLICATIONS

Rodriguez et al., "Toward a Sparse Self-Organizing Map for Neuromorphic Architectures," Apr. 27, 2015, ACM Journal on Emerging Technologies in Computing Systems (JETC), vol. 11, Issue 4, Article No. 33, pp. 1-25 (Year: 2015).*
Kurdthongmee, "A Novel Hardware-Oriented Kohonen SOM Image Compression Algorithm and its FPGA Implementation," Oct. 2008, Journal of Systems Architecture, vol. 54, Issue 10, pp. 983-994 (Year: 2008).*
De Abreu De Sousa, Miguel A., et al., "An FPGA Distributed Implementation Model for Embedded SOM with On-Line Learning," 2017 IEEE IJCNN, May 2017, pp. 3930-3937, retrieved from the Internet at <https://www.researchgate.net/publication/317570487_An_FPGA_Distributed_Implementation_Model_for_Embedded_SOM_with_On-Line_Learning/link/5ab00237aca2721710fde421/download> on Jul. 7, 2021, 9 pages.
European Patent Office, Extended European Search Report received for Application No. 18306671.1, dated Jul. 12, 2019, 9 pages, Germany.
International Searching Authority, International Search Report and Written Opinion received for International Application No. PCT/EP2019/084724, dated Jan. 31, 2020, 9 pages, European Patent Office, Netherlands.
Khacef, Lyes, et al., "Confronting machine learning with neuroscience for neuromorphic architectures design", in IEEE WCCI IJCNN, Jul. 2018, retrieved from the Internet at <https://www.researchgate.net/publication/325421229_Confronting_machine-learning_with_neuroscience_for_neuromorphic_architectures_design/link/5b4e135faca27217ff9e8693/download> on Jul. 7, 2021, 9 pages.
Rodriguez, Laurent, et al., "A distributed cellular approach of large scale SOM models for hardware implementation", in IEEE Conference on Image Processing and Signals (IPAS), Dec. 2018, 6 pages, Nice (Sophia-Antipolis), France, IEEE.
Rodriguez, Laurent, et al., "Toward a Sparse Self-Organizing Map for Neuromorphic Architectures", ACM Journal on Emerging Technologies in Computing Systems (JETC), Apr. 27, 2015, 26 pages, vol. 11, No. 4, AMC, US.
Rougier, Nicolas, et al., "Dynamic Self-Organizing Map", Neurocomputing, May 2011, pp. 1840-1847, vol. 74, No. 11, Elsevier, retrieved from the Internet at <https://hal.inria.fr/inria-00495827/document> on Jul. 7, 2021, 16 pages.
Upegui, Andres, et al., "Pruning Self-Organizing Maps for Cellular Hardware Architectures", in AHS 2018—12th NASA/ESA Conference on Adaptive Hardware and Systems, Aug. 2018, pp. 272-279, Edinburgh, United Kingdom, retrieved from the Internet at <https://hal.archives-ouvertes.fr/hal-01826263/file/PSM_AHS18.pdf> on Jul. 7, 2021, 9 pages.

* cited by examiner

T0: Each cell operates steps [306] and [308]

T1: Each cell operates steps [310], [312], [314], [316] and [318]

T2: Each cell operates steps [310], [312], [314], [316] and [318]

T3: Each cell operates steps [310], [312], [314], [316] and [318]

T4: Each cell operates steps [310], [312], [314], [316] and [318]

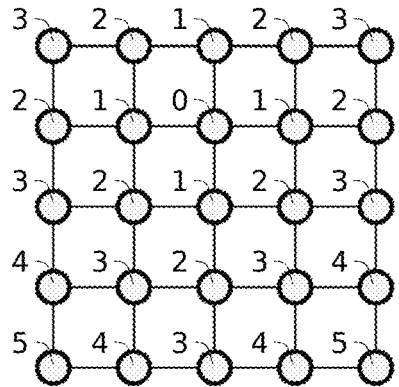
T5: Each cell operates steps [310], [312], [314], [316] and [318]
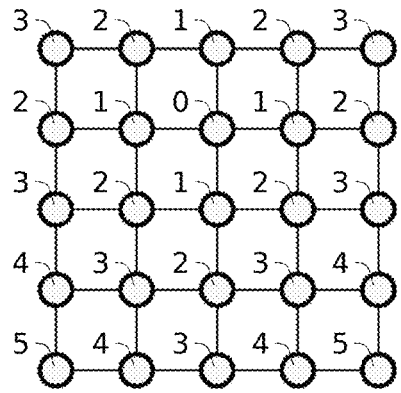
T6: Each cell operates steps [310], [312], [314], [316] and [318]
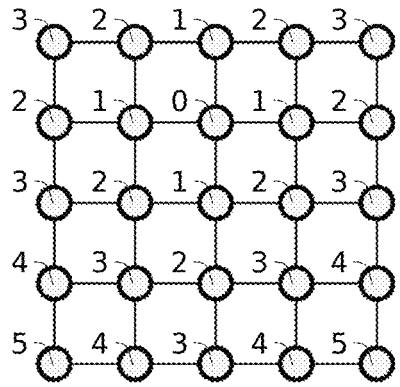
T7: Each cell operates steps [310], [312], [314], [316] and [318]
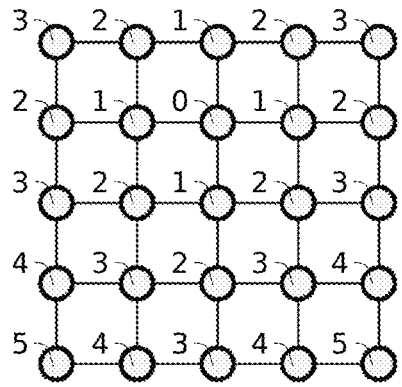
T8: Each cell operates [310], [312], [314], [316] and [318]
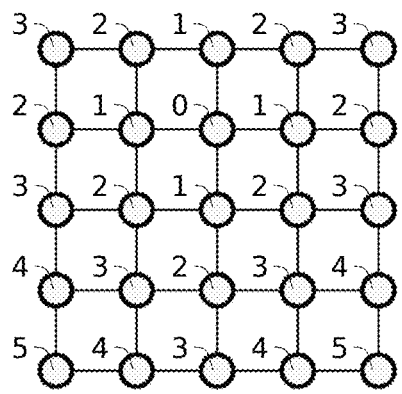
T9: Each cell operates step [320]
Fig. 3-b (cont'd)

Complexity expressed with respect to the SOM width m for a (m x m) squared map.

SOM Sw is the reference algorithm
SOM Sw Grid corresponds to the software implementation of the iterative grid
SOM Hw Grid corresponds to the hardware implementation of the iterative grid

DISTRIBUTED CELLULAR COMPUTING SYSTEM AND METHOD FOR NEURAL-BASED SELF-ORGANIZING MAPS

CROSS-REFERENCE TO RELATED APPLICATIONS

The present application is a national phase entry of PCT/EP2019/084724, filed on Dec. 11, 2019, which claims the benefit of priority of European Application No. 18306671.1, filed on Dec. 12, 2018, the entire contents of which are hereby incorporated by reference in their entirety for all purposes.

TECHNICAL FIELD

The present invention relates to the field of computing architectures and more particularly relates to a distributed cellular neuromorphic computing system and method.

BACKGROUND

Neuro-biological systems have been a source of inspiration for computational science and engineering. In parallel, the rapid improvements of digital computing devices may soon reach their technological and intellectual limits. This has motivated the emergence of alternative computing devices based on bio-inspired concepts. Bio-inspired computing field is closely related to the field of artificial intelligence, machine learning, artificial neural networks.

Moreover, by evolving from a personal computing usage to an ubiquitous computing paradigm, computers deserve now to be rethought: how to represent complex information, how to handle this information, and why dissociating data and computation?

In front of such issues, the brain still remains the best source of inspiration. It offers a different perspective on the organization of computing systems to meet the challenges of the increasing complexity of current and future devices. Several issues such as analysis and classification of major data sources (sensor fusion, big data, internet of things, etc.) and the need for adaptability in many application areas (driving delegation in automotive systems, autonomous drones, space exploration, etc.), lead to study a desirable property from the brain that encompasses all others: the cortical plasticity. This term refers to one of the main developmental properties of the brain where the organization of its structure (structural plasticity) and the learning of the environment (synaptic plasticity) develop simultaneously toward an optimal computing efficiency. Such developmental process is only made possible by some key features: focus on relevant information, representation of information in a sparse manner, distributed data processing and organization fitting the nature of data, leading to a better efficiency and robustness.

Transposition of those structural and synaptic plasticity principles onto computers relies on implementing a class of unsupervised artificial neural networks, named the "Self-Organizing Map" (SOM).

The Self-Organizing Map is a type of Artificial Neural Network (ANN) that is trained using unsupervised learning to produce a low-dimensional discretized representation of the input space of the training samples, called a map, and is therefore a method to do dimensionality reduction. The SOM model proposed by Kohonen allows a multi-dimensional feature space to be mapped into one with fewer dimensions, while retaining the most important characteristics. Like most ANNs, the SOMs operate in two modes or phases: training (or learning) and mapping. "Training" builds the map using input examples (a competitive process, also called vector quantization), while "mapping" automatically classifies a new input vector.

The visible part of a self-organizing map is the map space, which consists of components called nodes or neurons. The map space is defined beforehand, usually as a finite two-dimensional region where nodes are arranged in a regular hexagonal or rectangular grid. Each node is associated with a "weight" vector, which is a position in the input space; that is, it has the same dimension as each input vector. While nodes in the map space stay fixed, training consists in moving weight vectors toward the input data (reducing a distance metric) without spoiling the topology induced from the map space. Thus, the self-organizing map describes a mapping from a higher-dimensional input space to a lower-dimensional map space. Once trained, the map can classify a vector from the input space by finding the node with the closest (smallest distance metric) weight vector to the input space vector.

Finding the smallest distance metric is also known as finding the Best Matching Unit (BMU), or finding the 'winning neuron' whose weight vector lies closest to the input vector.

The architectures to operate the SOM algorithms usually employ a central unit to control the parallel processing blocks of the system. In these centralized approaches, distance calculation to the input vector is often concurrently executed for all the neurons. Other processes, such as searching for the winning neuron, are usually performed by the central control unit, which must gather distance values from all the neurons to trigger the searching process.

However, the centralized implementation of ANNs in general and of SOMs in particular suffers from the so-called Von Neumann bottleneck. It is hence not scalable in terms of latency. Consequently, some hardware architectures propose a distributed implementation but at the cost of massive interconnections, as every neuron is connected to all other neurons. This kind of all-to-all connectivity is not scalable either. Therefore, a recent work of M. A. de Abreu de Sousa and E. Del-Moral-Hernandez in "An FPGA Distributed Implementation Model for Embedded SOM with On-Line Learning," 2017 IEEE IJCNN, May 2017, pp. 3930-3937, discloses a distributed cellular computing approach with local connectivity for Embedded SOM (EmbSOM), where the neurons local information is propagated through the neural network until the global information emerges. Nevertheless, this implementation suffers the several following limitations:

Hardware optimization: EmbSOM relies on two simplifications of the original SOM algorithm: firstly, it uses the Manhattan distance instead of the Euclidean distance for the weights to input distance computing due to the absence of the square root circuitry, and this approximation influences the weights update mainly in the well-known DSOM and PCSOM algorithms, thus limiting the genericity of the method; and secondly, both multiplicators in the update function are implemented with rotation operators, which restricts their values to the negative power of two numbers. Although these two strategies are usually employed in the hardware implementations to reduce the computational complexity, there is no evidence in the article that the hardware SOM behavior does not differ from the software algorithm.

Parallel inputs: EmbSOM inputs the whole vector $x_i$ at once, which implies a massive afferent connectivity and a parallel computing on the vector components, which is not scalable with N-dimensional vectors when N is large (e.g. N=784 for MNIST digits learning).

Fully combinatory architecture: EmbSOM admits one input vector/clock cycle, and the processes of calculating all neuron distances to the input vector, searching for the Best Matching Unit, and for updating the weight vectors, according to the distance in the lattice to the winning neuron are performed in a single clock cycle. This assumption goes against the iterative computing paradigm in the SOM grid to propagate the neurons information. Hence, the implementation is almost fully combinatory, and that's why the maximum operating frequency is low and decreases when increasing the number of neurons. Therefore, the EmbSOM implementation is not scalable in terms of both hardware resources and latency.

Thus, there is the need of a solution to solve the aforementioned problems. The present invention offers such solution.

BRIEF SUMMARY

According to a first embodiment of the present invention, there is provided a system as further described in the appended independent claim 1, and a method as further described in the appended independent claim 8.

Particularly, a neuromorphic computing system configured to be trained using unsupervised learning through distributed computing means is disclosed. The neuromorphic computing system comprises an artificial neural network implemented as a (N×M) grid of locally connected cells, wherein each cell having initial weights and being connected to its direct closest neighbors. The neuromorphic computing system comprises a clock system providing periodic active clock edges, and further comprises means configured to simultaneously and synchronously in each cell:

at a first active clock edge:
  (a1) receive a same multidimensional input data;
  (b1) calculate an Euclidean distance value between the initial cell weights and said multidimensional input data; and
  (c1) set an initial Manhattan distance value;

iteratively at each of the next (N+M−2) active clock edges:
  (d1) compare the Euclidean distance value calculated at the previous active clock edge to the Euclidean distance values of the direct closest neighbors, to determine the minimum Euclidean distance value; and
  (e1) if the minimum Euclidian distance value is different from the Euclidean distance value of said cell: update the Euclidean distance value of said cell by the minimum Euclidean distance value, and update the Manhattan distance value of said cell to a value represented by the number of clock cycles since the iterative process;

at a next ((N+M−2)+1) active clock edge:
  (f1) update the cell weights using an unsupervised learning rule.

The neuromorphic computing system further comprises means as further described in the appended dependent claims.

In an embodiment, the neuromorphic computing system comprises a data acquisition layer configured for acquiring raw data and a pre-processing layer configured for extracting characteristic features from the acquired raw data and providing a multidimensional input data as a vector representation of the extracted characteristic features.

In another embodiment, the grid is organized in a MESH topology.

In an embodiment, the artificial neural network is a SOM-like artificial neural network.

In various implementations, the SOM-like artificial neural network is one of the Kohonen SOM (KSOM), the Dynamic SOM (DSOM) or the Pruning Cellular SOM (PCSOM) artificial neural network.

In a preferred embodiment, the neuromorphic computing system is implemented a Field Programmable Gate Array (FPGA) or as an Application Specific Integrated Circuit (ASIC).

The Self-Organizing Map (SOM) is implemented in an iterative grid made of locally connected computing cells in a MESH topology, and performing the neurons computations in a sequential way as follow: the cell first computes the distance (through a distance computing unit) between its afferent weights (stored in a weights unit) and the input vector (received at an input buffer). Then, the cell compares this distance to its closest neighbor neurons distances (through a comparator unit), and stores the minimum value (in the BMU value unit) as well as the corresponding topological Manhattan distance (in the BMU hops unit). This comparison is made a number of times corresponding to the necessary number of iterations to propagate the BMU information in the whole grid. The propagation is called the winner wave. Finally, all cells update their afferent weights (within a weights update unit) according to the SOM learning equation. This phase is called the learning wave.

Advantageously, the iterative method of the present invention brings a formalized, validated, generic and hardware-efficient solution to the scalability problem of centralized and fully-connected distributed SOMs implementations.

Another object of the invention is a method for operating a neuromorphic computing system configured to be trained using unsupervised learning through distributed computing means, the neuromorphic computing system comprising a Self-Organizing Map (SOM) implemented in a grid organized as a plurality of locally connected cells wherein each cell comprises neuron computing means to perform neuron computations, the method comprising at least the step of having at each active edge of a clock system each cell of the grid performing neuron computations on an input multidimensional data and the step of propagating the result of the cell neuron computation to its closest connected neighbors at the next clock edge.

There is also provided a computer readable medium having encoded thereon a computer program comprising instructions for carrying out the steps of the method of the invention when the computer program is executed on a computer.

Further advantages of the present invention will become clear to the skilled person upon examination of the drawings and detailed description. It is intended that any additional advantages be incorporated therein.

BRIEF DESCRIPTION OF THE SEVERAL VIEWS OF THE DRAWING(S)

Embodiments of the present invention will now be described by way of example with reference to the accompanying drawings in which like references denote similar elements, and in which.

DETAILED DESCRIPTION

Figure 1:
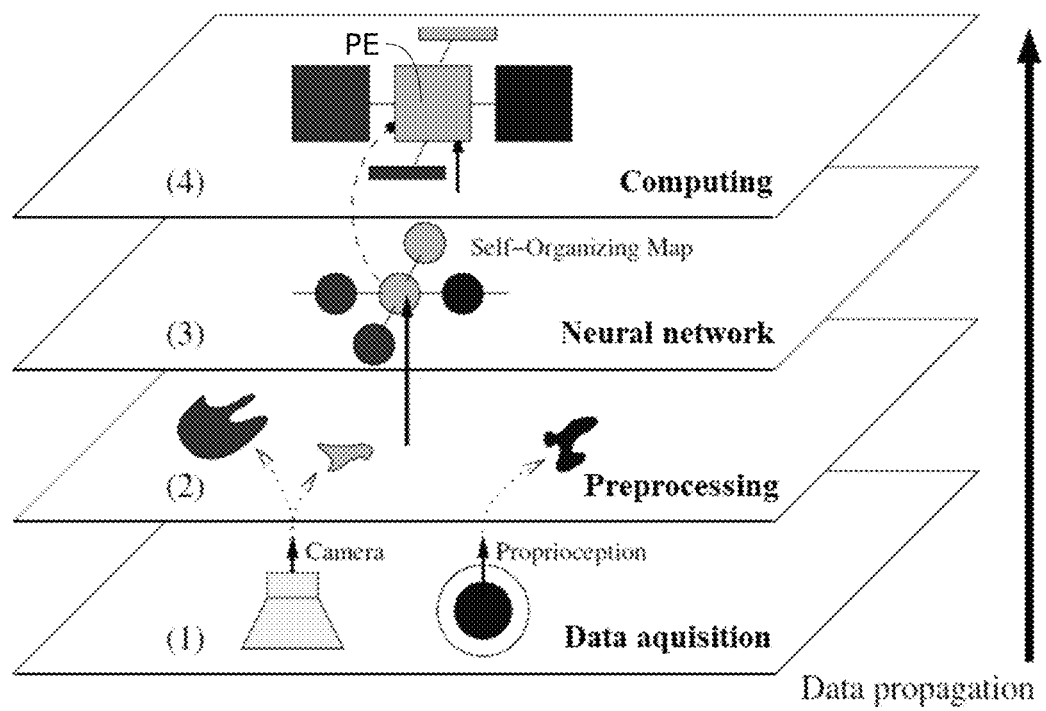
FIG. 1 shows a simplified block diagram of a neuromorphic computing system of the present invention.

With reference first to FIG. 1 which is a non limited example, a general architecture of a neuromorphic computing system of the present invention is depicted.

The system is illustrated as a multilayered architecture having a data acquisition layer (1), a preprocessing layer (2), an adaptation layer (3) and a computing layer (4). Whereas in the exemplified architecture the adaptation layer and the computing layer are two distinguished layers, in alternate embodiments of the architecture, the adaptation layer (3) and the computing layer (4) are merged into a unique layer.

Generally, the data acquired from the first acquisition layer (1) are preprocessed in order to extract the saliency of each sensor's information thanks to the preprocessing layer (2). Then the adaptation layer (3) formed by an Artificial Neural Network acting as a Self-Organizing Map (SOM) according to the principles of the present invention, learns the structure of the given preprocessed data in order to organize the tasks deployed on the grid of Processing Elements (PEs) composing the computing Layer (4).

The first layer (1) called data acquisition layer is responsible for acquiring the data from the input sensors (visual, auditory, proprioception, etc.). This layer depends on the targeted platform on which the system is implemented (robot, camera . . . ).

The second layer (2) is called the preprocessing layer as the acquired data are preprocessed in order to guide the system's behavior according to a certain source of interest in the perception of the external environment. Indeed, the emergent organization of the computing areas will develop according to the richness (the saliency) of the stimuli on the inputs of the neural map. This saliency will correspond to the result of the preprocessing layer. It will act as a preprocessing layer guiding the system's behavior according to a certain source of interest in the perception of the external environment.

The third layer (3) is the adaptation layer. It is structured around a sparse neural map which learns the environment from experience. This learning process builds an internal representation of the density (in the statistical sense) of the input stimuli in order to adapt the size of each computing area to the density (richness) of the corresponding modality.

Finally, the fourth layer (4) is the computing layer. This layer is organized as an array of Processing Element (PE). A PE executes a set of neuro-cognitive processes in order to drive actions. In an implementation for a robot, the actions are different tasks as object tracking, indoor navigation, human imitation . . . .

Figure 2:
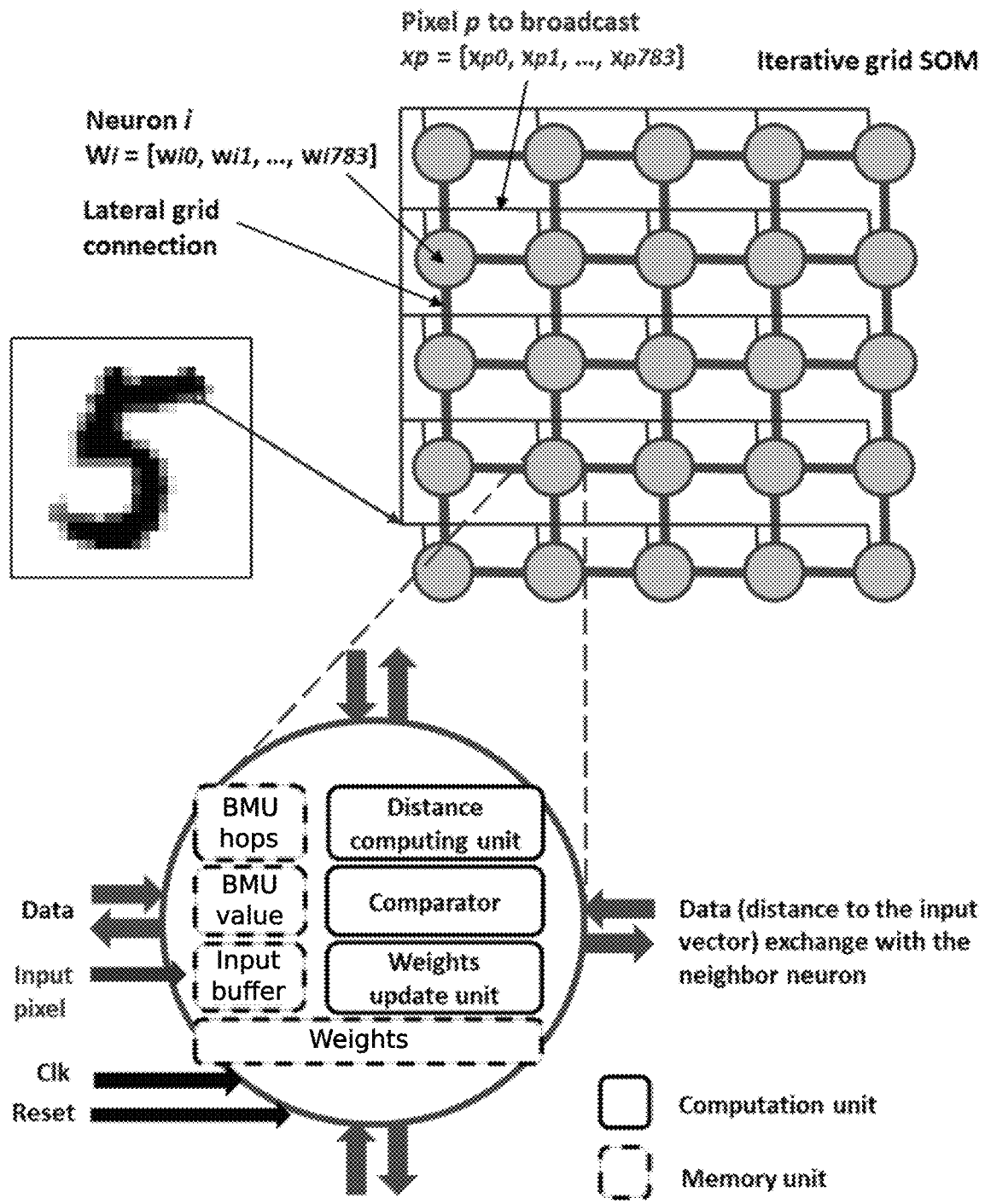
FIG. 2 shows a functional diagram of the iterative grid cells of the present invention in an embodiment.

Going now to FIG. 2, a general functional diagram of the iterative grid SOM of the present invention is described. Advantageously, the architecture of the iterative grid SOM allows for scalable hardware implementation, and is particularly adapted when one wants to implement large SOM-like neural models in hardware. It mainly consists of the hardware implementation of the distributed software algorithm described with reference to FIG. 3a. Particularly, each neuron of the iterative grid is implemented as a dedicated hardware accelerator as it is zoomed in the bottom of FIG. 2 which shows all the block units (memory units and computation units) within a neuron 'i' and all the communication input and output links (data; pixel; clock; reset) associated to each neuron.

In a preferred embodiment, the entire network is built following a MESH topology where each neuron is laterally connected to its four neighbors, generally in a geographical position called North, South, East, West.

In the example of FIG. 2, a pixel 'p' from an input vector 'xp' (representing an image of the number '5') is to be broadcasted to the entire network. At each neuron, the input pixel is received within an input buffer at an active edge of a clock system. The clock system may be a clock provided by a Field Programmable Gate Array (FPGA) or an Application Specific Integrated Circuit (ASIC) on which the neuromorphic computing system is implemented.

Each neuron 'i' comprises several memory units comprising an input buffer to receive the input pixels, a weights unit configured for storing weights parameters, a BMU value unit configured for storing the Best Matching Unit weights and a BMU hops unit configured for storing the Manhattan distance to the BMU. Each neuron 'i' further comprises several computation units comprising a distance computing unit configured for calculating a distance between the input vector 'xp' and the weights of the current neuron 'i', a comparator unit configured for comparing the neuron's distance and its neighbor neurons distances to the input, and a weights update unit configured for performing the learning corresponding to the implemented SOM model. Each dimension of the input vector comes sequentially at each active clock edge, permitting to apply the method of the invention to high-dimension data.

Figure 3A:
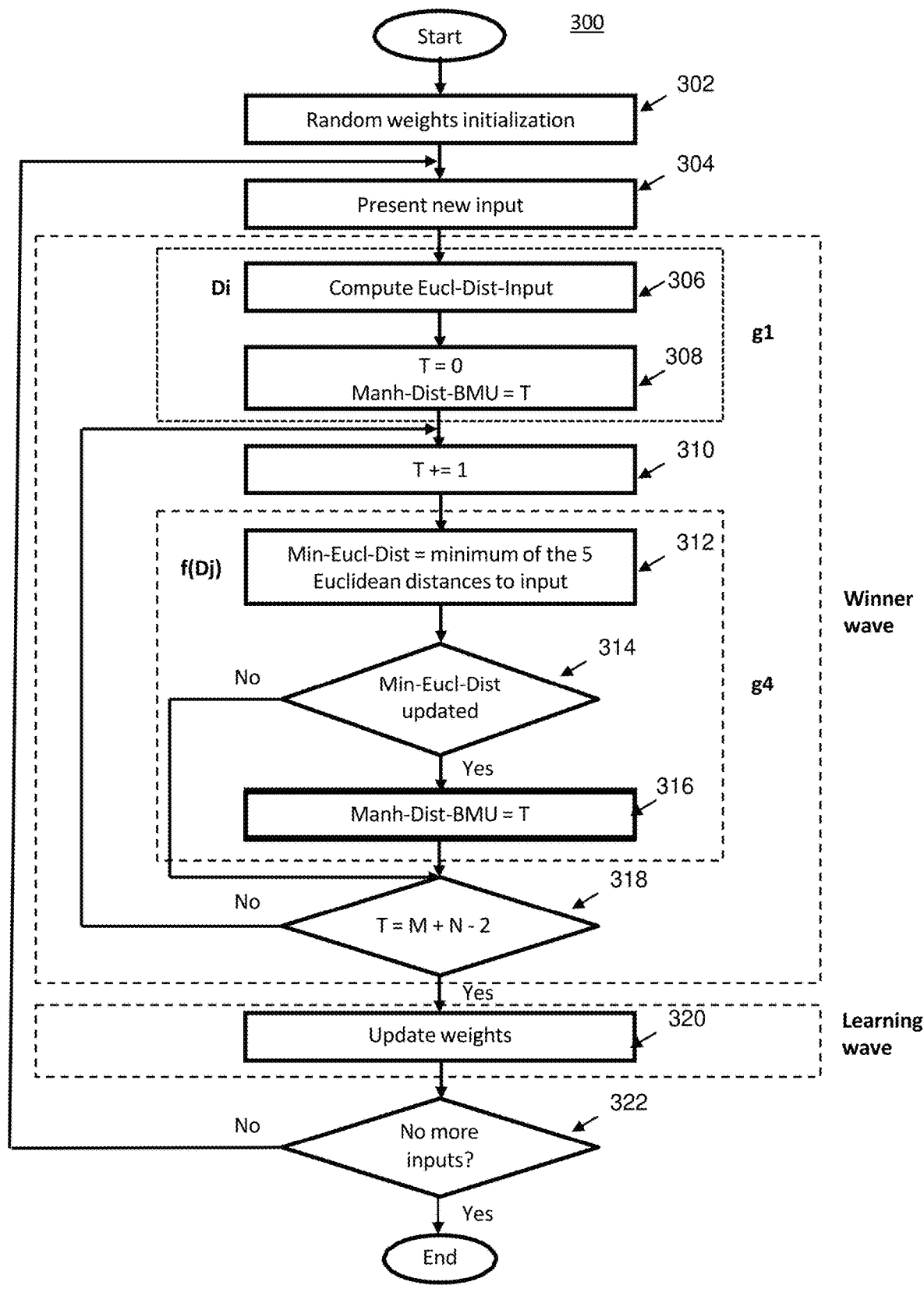
FIG. 3a shows a flow chart of the steps to operate the neuromorphic computing system of the present invention in accordance with an embodiment of the present invention for the KSOM model.

Going now to FIG. 3a, a flowchart of the steps (300) executed within a neuron processing element of the computing layer is described. While FIG. 3a illustrates the process for operating the learning phase in accordance with an embodiment of the present invention for the KSOM model, it is to be appreciated that the iterative grid approach of the present invention allows for the implementation of SOM, DSOM and PCSOM models.

The Dynamic SOM (DSOM) model proposed by Rougier and Boniface in "Dynamic Self-Organizing Map," Neurocomputing, vol. 74, no. 11, pp. 1840-1847, 2011, has the property to readapt in front of structural change of the input set. The learning rate and the neighborhood function are no more computed with respect to the current time, but vary relatively to the distance between the current stimulus and the afferent weights vector of the BMU. Therefore, the plasticity rate of the DSOM is no more function of time but instead sensible to the good representation of the data. This allows an adaptation to structural changes in the input stimuli all along the life of the network.

The Pruning Cellular SOM (PCSOM) introduced by A. Upegui, B. Girau, N. P. Rougier, F. Vannel, and B. Miramond, "Pruning Self-Organizing Maps for Cellular Hardware Architectures" in AHS 2018—12th NASA/ESA Conference on Adaptive Hardware and Systems, Edinburgh, United Kingdom, August 2018, is, like for the DSOM, abstracted from the time dependency of the KSOM. In addition, it models a specific mechanism of biological neurons: the synaptic pruning. Indeed, each neuron has a number of associated synapses that define on which neuron it has an influence. Synapses can be seen as interconnection matrices. In the case of the SOMA architecture, we will naturally assume that synapses are initially interconnecting every neuron to its four physical neighbors. Afterwards, during the network lifetime, some of these synapses will be pruned in order to allow the prototype vectors to better fit the density function. The goal here is to remove useless lateral synapses that will prevent the network to achieve optimal performance. Preliminary results have shown that the proposed pruning mechanisms improve the network performance by reducing the average quantization error of the incoming stimuli, and thus allow better learning and representation of the information from the environment.

These three models can be described by two main steps: a first step for the election of the BMU with respect to a current stimulus, and a second step for the adaptation of the afferent weights for all neurons with respect to the results of the first step.

These two steps are classically computed thanks to a centralized block which compares all neural activities to compute the BMU and then broadcast its position to all the neurons of the map. The invention differs from this centralized method to offer a fully distributed architecture with local connectivity, thanks to the proposed iterative grid formalism.

One can consider a 2-dimensional grid shaped Network on Chip (NoC). It means that each node (neuron) of the network is physically connected (only) to its four closest neighbors. The minimum protocol is to provide no control on the NoC itself. At each active clock edge, each node reads the data provided by its neighbors and relays it to its own neighbors on the next one. The data is propagated (or broadcasted) in a certain amount of time to all the nodes. The maximum amount of time Tp which is needed to cover all the NoC (worst case reference) depends on its size: for a N×M grid, Tp=N+M−2. After Tp clock edges, new input data can be sent. A set of Tp iterations can be seen as a "wave of propagation". In this context, the solution to the scalability problem arises from this finding: "When a data is iteratively propagated through a grid network, the propagation time is equivalent to the Manhattan distance between the source of the propagation and each receiver", which is also called "the time to Manhattan distance transformation rule".

The algorithm 1 below describes the propagation wave, with 'g1' a function representing some computation and eventually some storage in the node memory with respect to the Dc value; 'f' a function on the data provided by the neighbors and the current propagation time; and 'g4' a similar function to 'g' with respect to the computed value at t−1 and the one of the neighbors. Further 'i' is the radius of the propagation which depends on the application. For instance, with i going from 1 to the half perimeter of the grid, the wave is large enough to cover all the cells regardless of the origin of the data. This is necessary for a SOM implementation over this substrate to allow the BMU to emerge from the entire map. It is to be noted that in very improbable but yet possible cases, multiple BMUs can emerge from this kind of methods: each neuron is then influenced by its closest BMU in the grid. This substrate allows implementing a cellular architecture able to distribute the centralized behavior of the KSOM, DSOM and PCSOM models into each node of the NoC. In the three cases, the functions f and g and the data D are described for the winner election step (the winner wave) and the learning one (the learning wave). For each model, the neurons compute an afferent excitation which is used to compose the initial data D of the winner wave. A common part is the initial computed value Dc, where each neuron computes the Euclidean distance between the input vector and its own afferent weights vector.

Algorithm 1: Cellular propagation wave algorithm.

1: $T_0$: Lets $D_c$ the initial data of the cell
2: compute $R \leftarrow g_1(D_c)$
3: Write R on the output buffer
4: for all $T_i$ do
5:  for all $D_j$ do
6:   compute $R_j \leftarrow f(D_j, T_i)$
7:  end for
8:  compute $R \leftarrow g_4(R, R_0, R_1, R_2, R_3)$
9:  Write R on the output buffer
10:  Switch output buffers
11: end for The general process is mainly composed of a winner wave propagation phase (steps 306 to 318) and a learning wave phase (step 320).

As preliminary steps, the process allows on a first step (302) for a random weights initialization of the neuron 'i', and on a next step (304) allows for a new input reception of a multi-dimensional data. Then the process enters the winner wave propagation phase having a first sub-process '$g_1$' to compute (306) a distance to input and set (308) a first Manhattan distance to the BMU.

For the KSOM implementation in the iterative grid, several parameters are defined in order to compute the winner search, namely Dc, R, $g_1$, f, and $g_4$ wherein:

Dc is the Euclidean distance computed by the neuron before the wave;

R is a couple ($D_{min}$; T) with $D_{min}$ the distance of the BMU detected by the neuron at a certain iteration of propagation T. It is to be appreciated that because the propagation time T is equivalent to the Manhattan distance, T must be coherently coupled with the corresponding $D_{min}$ for the learning equation computation;

$g_1$ sets the couple R=($D_c$; 0);

f sets $R_j$ values to the respective couple ($D_j$; $T_i$); and $g_4$ selects the couple with the minimum distance D between R;$R_0$;$R_1$;$R_2$;$R_3$ and stores it as a result in a neuron's output buffer, such as in the BMU Value Unit. It is to be noted that if two couples or more have the same minimum D value, the first one with the minimum propagation time T (which will be equals to Ti) is selected. With this strategy, in the improbable presence of multiple equal minimum value, each neuron will memorize the closest one. This choice seems natural regarding the neighborhood function used in the learning rule, but others strategies could be setup. For instance, an average of influence could be computed for a lesser loss of information.

After the '$g_1$' sub-process, next the process allows for incrementing (310) the propagation time T, and then entering a second sub-process $g_4$ to compute the minimum distance to input between the neuron and its four neighbor neurons (312), as well as to update the neuron distance to BMU (316) if the minimum distance has changed or been updated (314).

On next step (318), the process allows to determine if all the necessary number of iterations has been made, corresponding to the size of the grid "M+N−2".

After the winner wave propagation, each neuron contains a couple value ($D_{min}$; T) with $D_{min}$ being common for each of the neuron and T being distinct values depending on the Manhattan distance to the BMU of each neuron.

Next, the process enters a KSOM learning wave phase (320) allowing the neuron weights updating. From the previous winner propagation wave, every useful data is present in each neuron to compute the learning equation. No propagation wave is thus necessary at this step. Nevertheless, since the learning parameters are common to all neurons, they can be computed either by only one cell and broadcasted with the iterative grid to all the remaining cells.

The process allows next to determine if new inputs are to be received (322) to end the process or to go back to step (304) to process the next input.

Figure 3B:
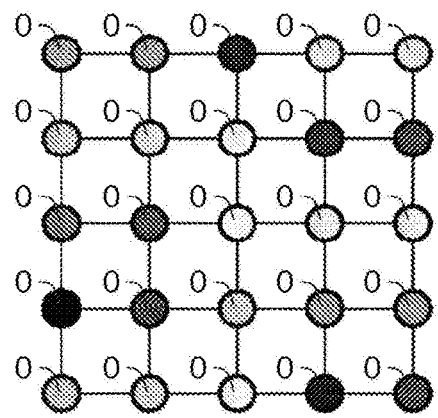
FIG. 3b illustrates the steps of the flow chart of FIG. 3a for a (5×5) grid.
Figure 3B:
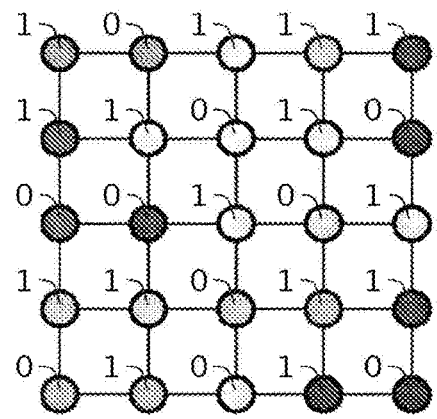
Figure 3B:
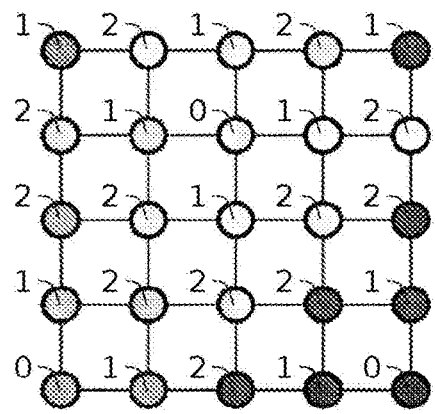
Figure 3B:
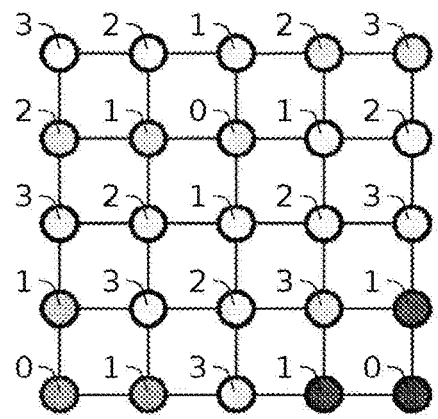
Figure 3B:
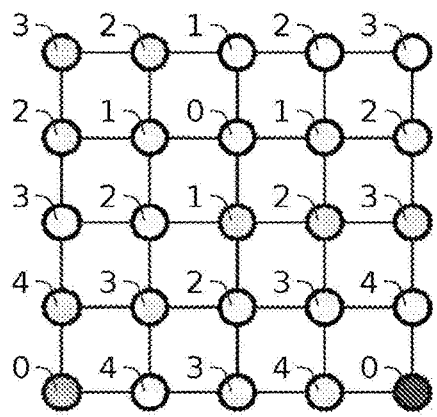

FIG. 3b illustrates the propagation steps of FIG. 3a on a (5×5) iterative grid, wherein:
- at T0, each of the 25 cells operates simultaneously and synchronously, steps (306, 308); then
- from T1 to T8, during (N+M−2=8 cycles), each of the 25 cells operates simultaneously and synchronously, steps (310, 312, 314, 316, 318); and
- at T9, each of the 25 cells operates simultaneously and synchronously, step (320).

It can be appreciated that in the illustrated example, advantageously, the propagation is done at T5.

Figure 4:
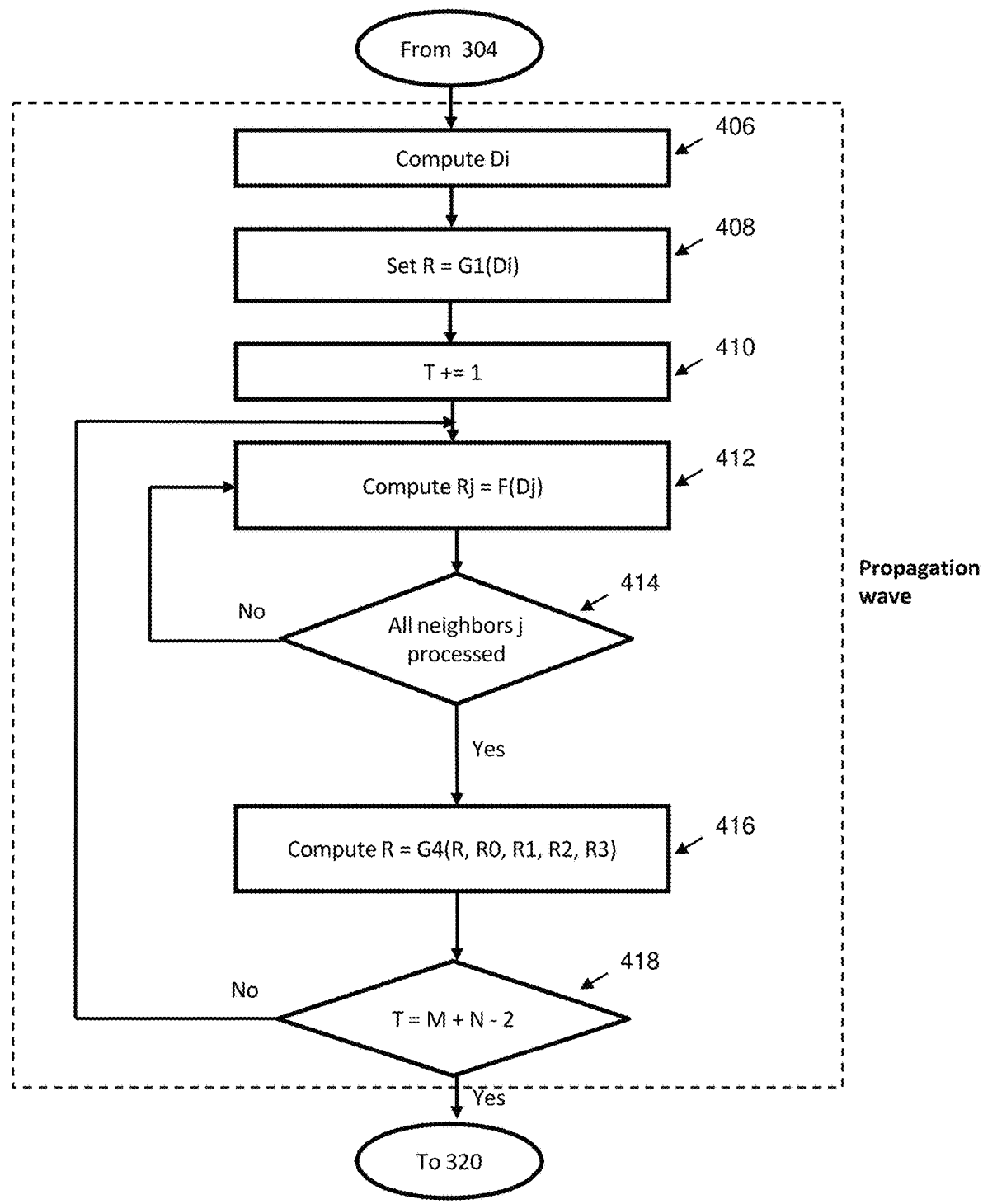
FIG. 4 shows a flow chart of the steps of the generic winner wave in the iterative grid.

FIG. 4 shows a flow chart of the steps (406 to 418) of the winner wave propagation phase in the iterative grid of the present invention for any SOM-like neural model. The process is described as beginning after step (304) of FIG. 3a and ending before step (320).

The implementations in the iterative grid for the DSOM and the PCSOM models are as follow:

DSOM Implementation in the Iterative Grid:
  The DSOM winner wave is the same than that of the KSOM.
  The DSOM learning wave: all the necessary data are given by the winner wave and the learning equations of the DSOM can be computed by each neuron without the need of a new propagation wave.

PCSOM Implementation in the Iterative Grid:
  The PCSOM winner wave: the winner propagation wave is mostly the same than that of the KSOM. In addition, the presence of a valid path between each neuron and the BMU is also to be computed during the propagation. Then Dc, R, g1, f and g4 are to be redefined with respect to this consideration:

Dc remains the Euclidean distance computed by the neuron before the wave. R is a 7-tuple (Dmin, T, Pv, Pv0, Pv1, Pv2, Pv3) with Dmin still the distance of the BMU detected by the neuron at a certain iteration of propagation T. The Hops of the PCSOM equation is the Manhattan distance between the neuron and the BMU. Then again Hops=T and T must remain coherent with the corresponding Dmin and Pv for the learning equation computation. Therefore, the T value of the tuple R remains unchanged if R is selected by g4 or becomes Ti otherwise. Pv is a Boolean value that represents the existence of a valid path between the BMU and the neuron. Finally, Pv0 to Pv3 represent the validity of the lateral synapses which connect the neuron to its four closest neighbors. g1 simply sets the couple R=(Dc,0,True), and f is very similar to g1 and sets Rj values to the respective 3-tuple (Dj,Ti,Pvi). The value of Pvi is computed True if and only if the Pv value of the neighbor i and Pvi are True. This means that there exists a lateral synapse between the neuron and this neighbor and it is propagating a potential BMU value with a valid path. Finally, g4 selects the couple with the minimum distance D between R, R0, R1, R2, R3 and stores it as a result in the output buffer of the neuron. If two tuples or more have the same minimum D value, the one with the minimum propagation time T is selected. If there is a choice between multiple tuples with the same T, then the first one with a valid path is selected. With this strategy, in the improbable presence of multiple equal minimum value, each neuron will memorize the closest one with a preference for a valid path. After this propagation wave, each neuron contains a 7-tuple (Dmin, T, Pv, Pv0, Pv1, Pv2, Pv3). An important data to be maintained by the neurons is Tb, i.e. the time from the last wining of the neuron. It is incremented by all the neurons except the BMU (with T=0) which resets its Tb to zero.

The PCSOM learning wave: Here the Dc, R, g1, f and g4 are distinct to the ones of the winner wave. We keep the same names to keep coherency with the iterative grid formalism but one must not confuse the values and functions of the learning wave with the ones of the winner wave.

The initial value Dc is the tuple (Hops, Pv, Pv0, Pv1, Pv2, Pv3, wn). The Hops value is the T value computed by the winner wave for each node. Pv is the Pv value computed by the winner wave and Pv0 to Pv3 represent the validity of the lateral synapses which connect the neuron to its four closest neighbors (the same initial values than for the winner wave). Finally, wn is the afferent weights vector of the neuron n. R is thus the tuple (Hops, Pv, Pv0, Pv1, Pv2, Pv3, wn).

Algorithm 2 below shows the g1 function of the learning wave of the PCSOM. This algorithm is an identity function from Dc to R and implements the learning step for the BMU cell. g1 implements the algorithm 2 which sets the initial values for any cells and performs the learning step of the BMU only.

```
1: R ← D_c
2: if Hops = 0 then
3:     w_n ← w_n + α(v − w_n)||v − w_n||
4: end if
```

Algorithm 3 below shows the f function of the learning wave of the PCSOM. This function selects the neighbors data which can be influencing neurons at the given propagation time Ti.

```
1: if Hops = T_i ∧ Hops_j = T_i − 1 ∧ Pv_j ∧ R_{pj} then
2:     R_j ← D_j
3: else
4:     R_j ← ∅
5: end if
```

The f function implements the algorithm 3 which selects a neighbor only if it is influential. The result of f is empty if it is not the case or if it is not yet the time for the neuron to learn (Ti≠Hops).

Algorithm 4 below shows the g4 function of the learning wave of the PCSOM. This function does the learning step for a cell if the propagation wave reaches the cell and a valid connection exists with the BMU.

```
1:   Let R_IN the set of R_j ≠ ∅
2:   if R_IN ≠ { } then
3:       Select R_i in R_IN
4:
         w_n ← w_n + α(w_i − w_n)e^{−\frac{1}{η}\frac{Hops}{\|w_i − w_n\|}}

5:   with w_i the weights vector of R_i
6:   end if
```

Finally, the g4 function in algorithm 4 applies the learning rule on the result of the f function: if f returns one or more (none empty) Rj, then it is time to learn and there is at least one of the neighbors that is an influential neuron. If the RIN set of the algorithm contains more than one element, one of them has to be selected randomly.

Once the learning wave is complete, the pruning can occur. The neurons can compute the pruning law using only one iteration of propagation to share the weights vectors and the Tb computed by the winner wave when a lateral synapse exists.

Figure 5A:
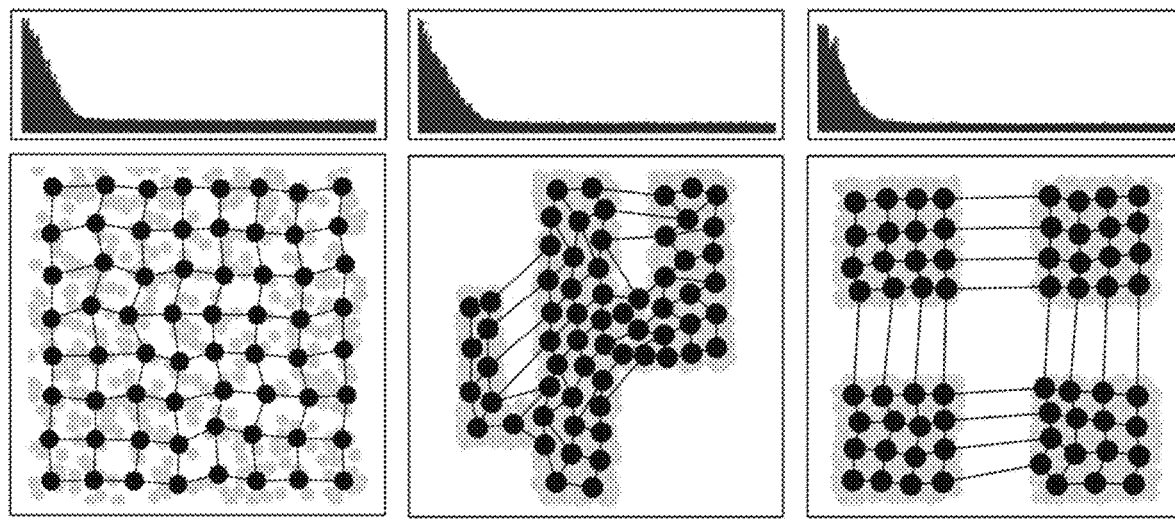
FIGS. 5a and 5b are illustrations of the iterative grid behaviour when trained with 3 different distributions of 2-dimensional stimuli.

As previously explained, the iterative grid is based on the time to distance transformation rule. This implies the use of a Manhattan distance in the models despite of the Euclidean one often used in software or centralized hardware implementations (for the topological distance of neurons in the grid, and not for the distance of weights to input as used in EmbSOM). For experimental comparison, the results of the behavior of centralized models using a Manhattan distance in the neighborhood functions have been compared to the results obtained with the iterative grid of the present invention. The behaviors are the same in both cases. For simplification and clarity reasons, FIGS. 5a and 5b show only the models simulated with the iterative grid of the present invention over three scenarii, with the KSOM model on FIG. 5a and the PCSOM model on FIG. 5b.

The three scenarii were run with the same random seed on both centralized and distributed versions and a comparison of the AQE (the top curves) and afferent weights distances between same neurons after the same number of learning iterations was made. When the Manhattan distance is used for the centralized version of the KSOM, the two implementations lead to exactly the same results for the AQE and a zero distance for the afferent weights. This illustrates that the KSOM model behaves the same way with or without using the iterative grid formalism. The same experiment was performed for the DSOM model and the same results are obtained.

Figure 5B:
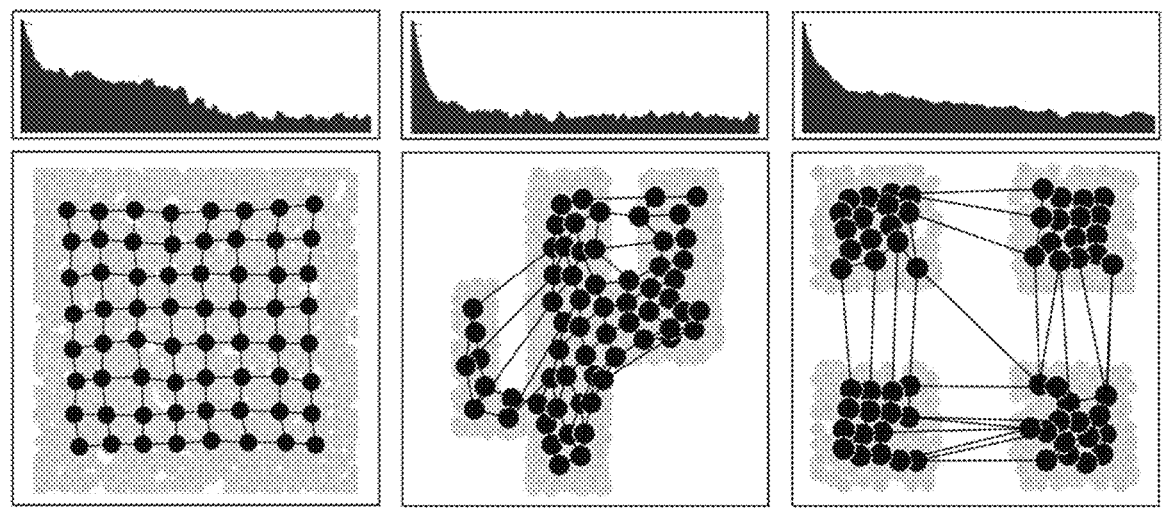

From FIG. 5b, one can see that the PCSOM model seems to behave as well when using the iterative grid. Again, the PCSOM behavior was compared to the behavior obtained with a centralized search for the winner by computing both AQEs and the afferent weights distances. The same results were obtained. These results confirm that, indeed, the iterative grid can be generalized to distribute any SOM-like model.

Figure 6:
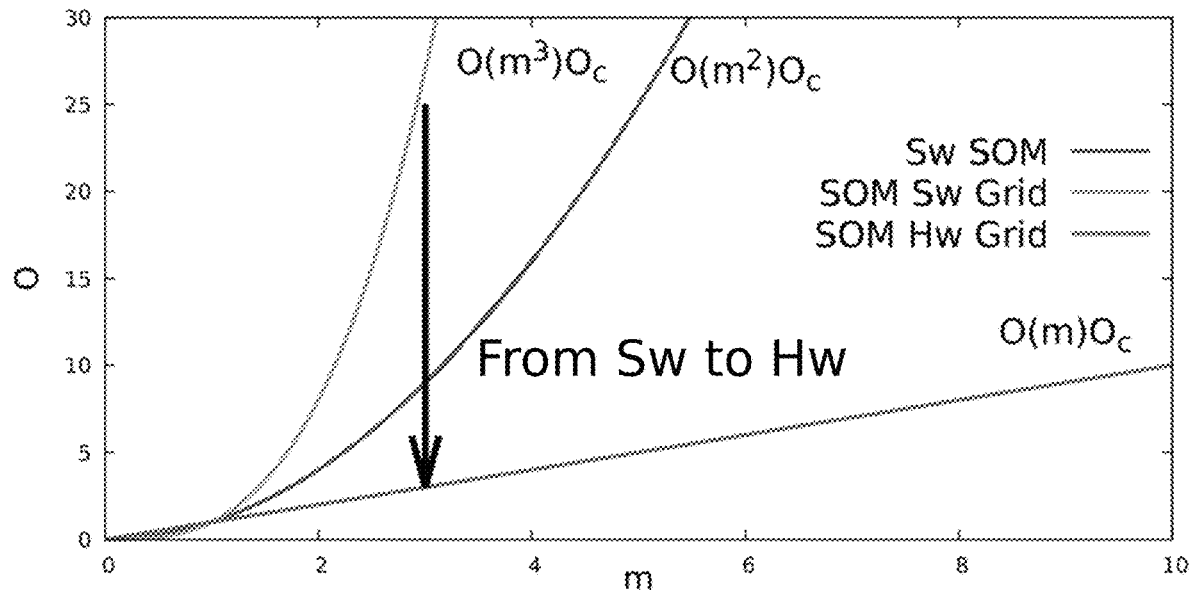
FIG. 6 shows the time complexity of the software implementation of the present invention compared to the expected hardware implementation.

In the article of L. Rodriguez, L. Khacef, and B. Miramond, "A distributed cellular approach of large scale SOM models for hardware implementation," in IEEE Conference on Image Processing and Signals (IPAS), IEEE, Ed., Nice (Sophia-Antipolis), France, December 2018, it is shown that there is a very important gain when implementing the iterative grid in hardware, the time complexity is reduced from $O(m^3)O_c$ to $O(m)O_c$, where m is the SOM lattice width and $O_c$ is the neuron complexity regardless of the implemented Kohonen-like SOM model. These results are illustrated on FIG. 6 which shows the time complexity of the software implementation of the present invention (SOM Sw Grid) compared to the expected hardware implementation (SOM Hw Grid). The time complexity of the classical SOM algorithm (SOM Sw) is also shown as a reference, which is not implementable in hardware for large scale networks.

Advantageously, as described the iterative grid offers several improvements over the EmbSOM approach previously cited, and which are mainly:

Input dimensionality: The iterative grid uses a time-multiplexed input such that the input vector components are broadcasted to all neurons and processed one by one at each clock edge, for two reasons: firstly, visual sensors such as cameras output their data pixel by pixel, there is thus no need to input the whole vector at once; and secondly and more importantly, the whole vector input used in EmbSOM is not scalable for high dimensional vectors, because of the massive afferent connectivity and the hardware cost of the fully parallel computing it implies. Indeed, the EmbSOM architecture is almost fully combinatory to be executed in one clock cycle, being thus not scalable to large SOMs. The man skilled in the art would find details on the time-multiplexed input in L. Khacef, N. Abderrahmane, and B. Miramond, "Confronting machine learning with neuroscience for neuromorphic architectures design," in IEEE WCCI IJCNN, 2018.

Formalism: The iterative grid mechanisms are formalized in the previously cited article of L. Rodriguez, L. Khacef, and B. Miramond, thanks to pseudo-algorithms ready for translation into functional code in software or hardware.

Validation: The iterative grid SOM behavior has been validated in the previously cited article of L. Rodriguez, L. Khacef, and B. Miramond in terms of average quadratic error and neurons afferent weights. These two metrics were compared between the proposed method and the original centralized version of the SOM, demonstrating the functional validity of the method over the performance optimization.

Genericity: The iterative grid is a generic neuromorphic substrate that has been successfully applied to the Kohonen SOM, the Dynamic SOM and the Pruning Cellular SOM, and can hence be used to distribute any Kohonen-like SOM in cellular neuromorphic architecture with local connectivity.

Waves complexity: The "smallest of 5" and "neighborhood" waves used in the EmbSOM approach have been coupled into one unique wave called "the winner wave", as the iterative grid is based on time to distance transformation to find the Manhattan distance between the BMU and each neuron. There is therefore an important gain in the time complexity (almost 50%) of the SOMs learning duration.

Solving the problem of multiple BMUs: The iterative grid allows solving the problem of multiple BMUs by having a simple process at each neuron to make a decision on which BMU to take into account if multiple BMUs come from multiple neighbor neurons.

Finally, it is to be appreciated that the invention with the iterative grid offers better formalism than known approaches, it has been tested and validated on various Kohonen-based SOMs. Moreover, it has a lower time complexity than prior art and relies on a mixed parallel/sequential hardware implementation that uses time-multiplexing for inputs and parallelism for neural computation. This implementation enables scalability in terms of both hardware cost and latency, thus being ready for integration in autonomous embedded systems.

Figure 7:
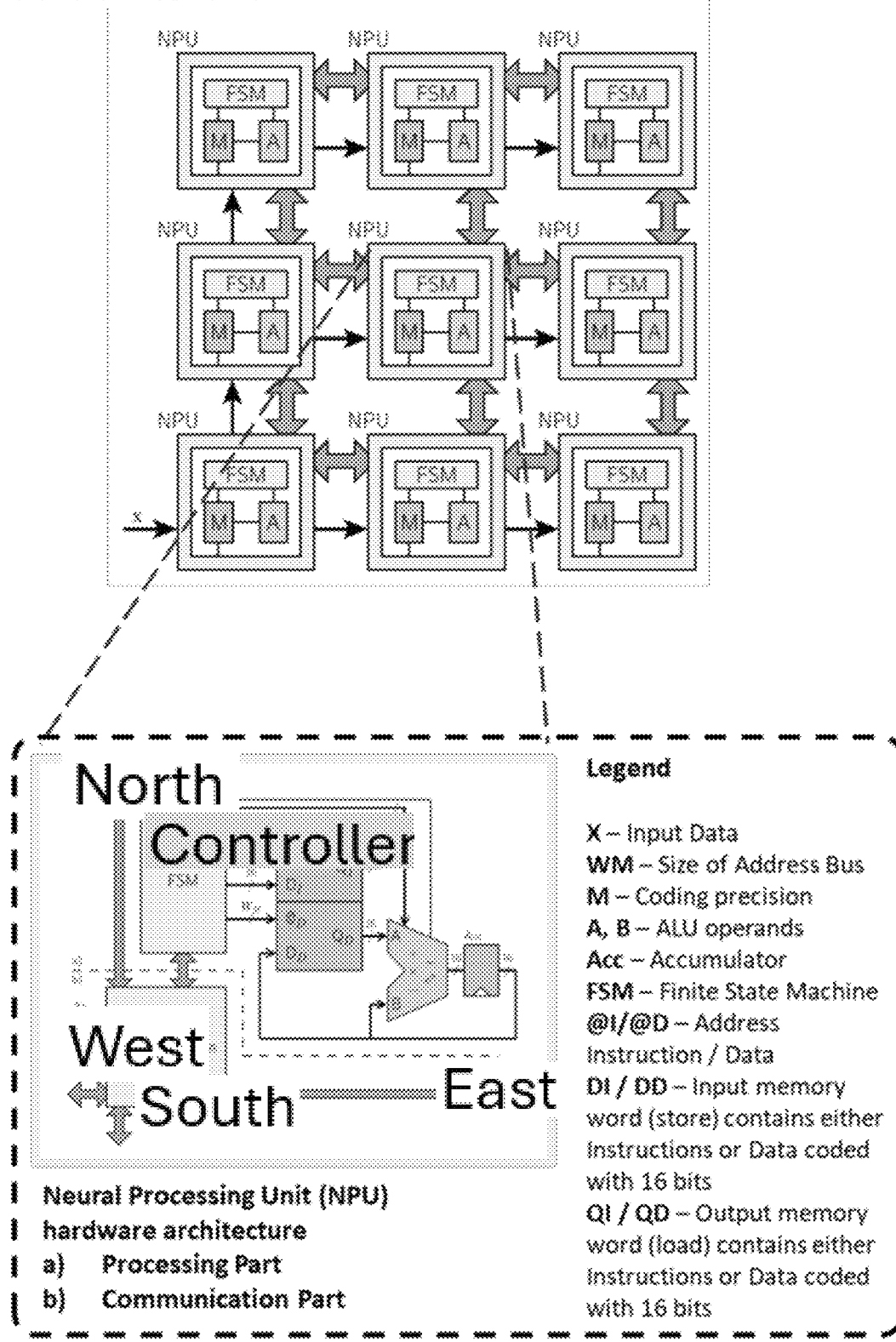
FIG. 7 shows an implementation of hardware architecture of iterative grid cells network of the present invention.

FIG. 7 shows an example of a hardware implementation of the iterative grid. It is composed of Neural Processing Units (NPUs) locally inter-connected in a MESH topology. The input is time-multiplexed (the image is received pixel by pixel at each clock edge) and broadcasted to each NPU. The NPU contains two main parts: the communication part and the processing part. The communication part is responsible of data exchange between the neuron and its neighbor neurons, and the processing part is responsible of all the neuron's computations. It relies on a Finite State Machine (FSM) that defines the flowchart described in FIG. 3a, where each block is defined as a "state". At each state, the FSM controller selects the corresponding data and instruction from the Dual Ported Random Access Memory (DPRAM) that will be computed in the Arithmetic and Logic Unit (ALU). The ALU stores the successive operations results in the accumulator at each clock edge, before returning the final instruction result to the DPRAM. This process is repeated until the flowchart execution is complete.

The invention claimed is:

1. A neuromorphic computing system configured to be trained using unsupervised learning, the neuromorphic computing system comprising a Self-Organizing Map-like (SOM-like) artificial neural network implemented as a (N×M) grid of locally connected cells, each cell having initial weights and being connected to its direct closest neighbors, the neuromorphic computing system comprising a clock system providing periodic active clock edges, the neuromorphic computing system further comprising circuits configured to simultaneously and synchronously in each cell:
   at a first active clock edge:
   (a1) receiving a same multidimensional input data as the initial weights;
   (b1) calculating a Euclidean distance value between the initial cell weights and said multidimensional input data; and
   (c1) setting an initial Manhattan distance value;
   iteratively at each of the next (N+M−2) active clock edges:
   (d1) comparing the Euclidean distance value calculated at the previous active clock edge to the Euclidean distance values of the direct closest neighbors, to determine a minimum Euclidean distance value; and
   (e1) if the minimum Euclidian distance value is different from the Euclidean distance value of said cell: updating the Euclidean distance value of said cell by the minimum Euclidean distance value, and updating a Manhattan distance value of said cell to a value represented by the number of clock cycles since the iterative process; and
   at a next ((N+M−2)+1) active clock edge:
   (f1) updating the cell weights using an unsupervised learning rule.

2. The neuromorphic computing system of claim 1, further comprising a data acquisition layer configured for acquiring raw data, and a pre-processing layer configured for extracting characteristic features from the acquired raw data and providing a multidimensional input data as a vector representation of the extracted characteristic features.

3. The neuromorphic computing system of claim 1, wherein the grid is organized in a mesh topology.

4. The neuromorphic computing system of claim 1, wherein the SOM-like artificial neural network is one of athe Kohonen SOM (KSOM), athe Dynamic SOM (DSOM), or athe Pruning Cellular SOM (PCSOM) artificial neural network.

5. A Field Programmable Gate Array (FPGA) comprising the neuromorphic computing system of claim 1.

6. An Application Specific Integrated Circuit (ASIC) comprising the neuromorphic computing system of claim 1.

7. A method for operating a neuromorphic computing system configured to be trained using unsupervised learning, the neuromorphic computing system comprising a Self-Organizing Map-like (SOM-like) artificial neural network implemented as a (N×M) grid of locally connected cells, each cell having initial weights and being connected to its direct closest neighbors, the neuromorphic computing system comprising a clock system providing periodic active clock edges, the method comprising simultaneously and synchronously in each cell, the steps of:
   at a first active clock edge:
   (a1) receiving a same multidimensional input data as the initial weights;
   (b1) calculating a Euclidean distance value between the initial cell weights and said multidimensional input data; and
   (c1) setting an initial Manhattan distance value;
   iteratively at each of the next (N+M−2) active clock edges:
   (d1) comparing the Euclidean distance value calculated at the previous active clock edge to the Euclidean distance values of the direct closest neighbors, to determine a minimum Euclidean distance value; and
   (e1) if the minimum Euclidian distance value is different from the Euclidean distance value of said cell: updating the Euclidean distance value of said cell by the minimum Euclidean distance value, and updating a Manhattan distance value of said cell to a value represented by the number of clock cycles since the iterative process; and
   at a next ((N+M−2)+1) active clock edge:
   (f1) updating the cell weights using an unsupervised learning rule.

8. The method of claim 7, further comprising, after step (d1), computing the Manhattan distance of each neuron to a Best Matching Unit, wherein the Best Matching Unit is a cell in the grid having the smallest Euclidean distance value, the Manhattan distance value being computed by applying a time to Manhattan distance transformation rule where a propagation time is equivalent to the Manhattan distance in a grid-shaped architecture.

9. The method of claim 7, further comprising a data acquisition layer configured for acquiring raw data, and a pre-processing layer configured for extracting characteristic features from the acquired raw data and providing a multidimensional input data as a vector representation of the extracted characteristic features.

10. A non-transitory computer readable medium having encoded thereon a computer program comprising instructions for carrying out the steps of the method according to claim 7 when said computer program is executed on a computer.

11. The method of claim 7, wherein the grid is organized in a mesh topology.

12. The method of claim 7, wherein the SOM-like artificial neural network is one of a Kohonen SOM (KSOM), a Dynamic SOM (DSOM), or a Pruning Cellular SOM (PCSOM) artificial neural network.

* * * * *